No. 633,748. Patented Sept. 26, 1899.
J. C. ANDERSON.
MILITARY BICYCLE.
(Application filed May 5, 1898. Renewed Mar. 9, 1899.)
(No Model.) 2 Sheets—Sheet 2.
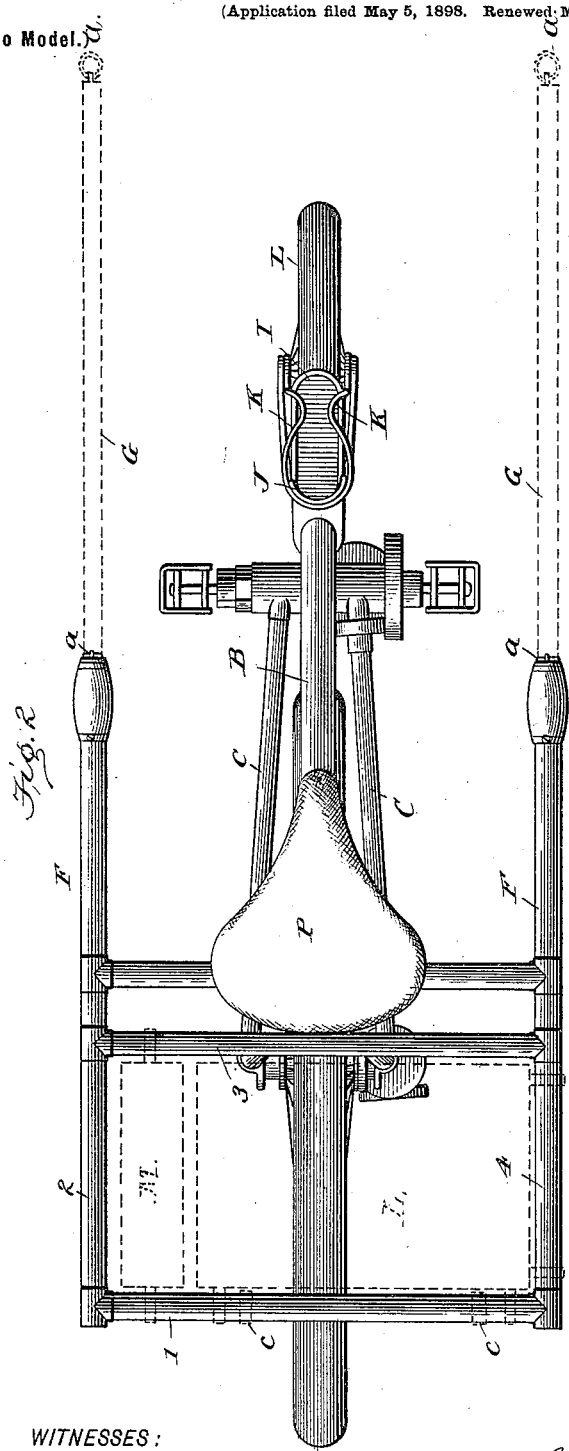
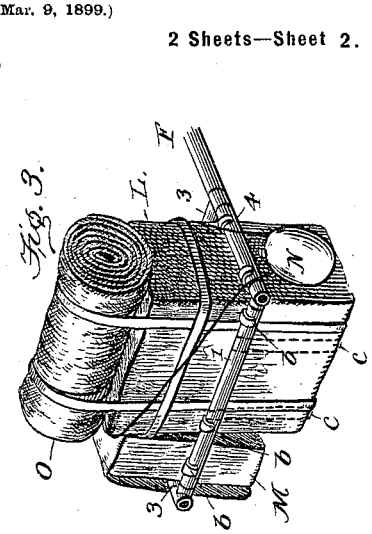
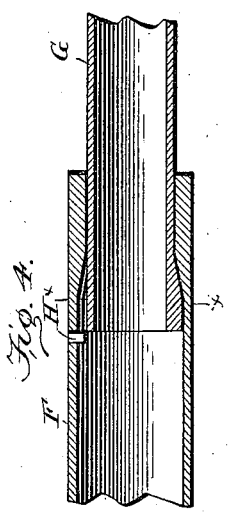
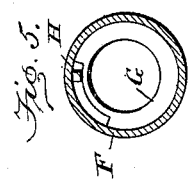
WITNESSES:
Edwin L. Bradford
N. Curtis Lammonds
INVENTOR
Jas. C. Anderson
BY
Wm C. R. W. Entire
ATTORNEY.
THE NORRIS PETERS CO., PHOTO-LITHO., WASHINGTON, D. C.

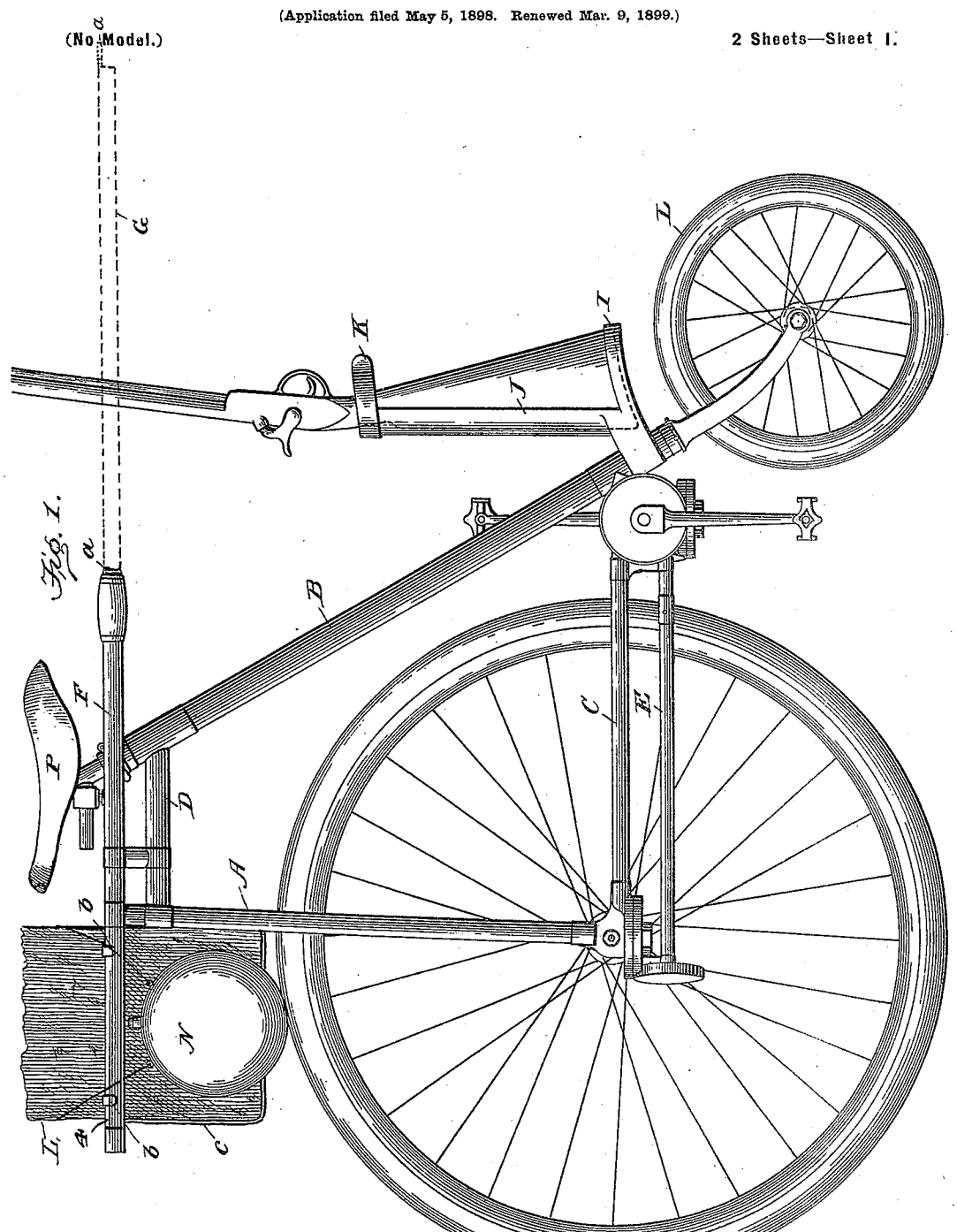

UNITED STATES PATENT OFFICE.

JAMES C. ANDERSON, OF HIGHLAND PARK, ILLINOIS.

MILITARY BICYCLE.

SPECIFICATION forming part of Letters Patent No. 633,748, dated September 26, 1899.

Application filed May 5, 1898. Renewed March 9, 1899. Serial No. 708,460. (No model.)

*To all whom it may concern:*

Be it known that I, JAMES C. ANDERSON, a citizen of the United States, residing at Highland Park, in the county of Lake and State of Illinois, have invented certain new and useful Improvements in Military Bicycles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to certain new and useful improvements in bicycle construction; and it has for its general object to provide a bicycle especially adapted for use in military service.

In bicycles of ordinary construction when used in military service it has been found that the accoutrements and gun of the soldier have to be carried upon the person of the rider, rendering it not only awkward for him to mount and dismount the machine, but also seriously retarding the pedaling action and soon fatiguing the rider. Another serious disadvantage attendant upon the ordinary construction lies in the fact that when the rider dismounts from the machine for the purpose of using his gun he must either let his machine fall to the ground or take the time and care necessary to place it in some suitable supported position, and if he advances his machine is left behind him and is unavailable for immediate reuse.

In addition to the general object of my invention as above stated my invention has for a further object to so construct a bicycle that the gun and accoutrements of the rider may all be suitably disposed upon and carried by the frame of the machine, the gun being so disposed in front of the rider and the handle-bars of the machine being of such construction that the rider on dismounting can grasp and remove his gun and, stepping in front of his machine, can trail the latter in an upright position behind him or, when occasion requires, disconnect himself entirely from the machine.

With these ends in view my invention consists in the peculiar details of construction and arrangement hereinafter and more particularly described.

In order that those skilled in the art of bicycle construction may know how to make my improved machine and that those for whose purposes it is especially designed may understand how to use the same, I will proceed to describe the construction and mode of using my improved bicycle, referring by letters and figures of reference to the accompanying drawings, in which—

Figure 1 represents a side view of one of my improved bicycles, showing a soldier's knapsack, canteen, and gun secured in position upon the frame of the machine. Fig. 2 is a top or plan view with the gun removed and showing in dotted lines the position of the knapsack and haversack. Fig. 3 is a perspective view of the rear portion of the cycle-frame with knapsack, haversack, canteen, and blanket suitably supported in position. Fig. 4 is a detail enlarged longitudinal section of the handle-bar, showing a section adapted to telescope with the handle-bar; and Fig. 5 is a cross-section of the same, taken at the line $x$ $x$ of Fig. 4.

Similar letters and figures of reference indicate like parts in the several figures of the drawings.

The frame proper of my improved military bicycle, with the exception of the supporting devices for the gun and accoutrements, is substantially the same as that described and claimed in another application, Serial No. 669,396, filed by me February 7, 1898, and, as shown, comprises a substantially vertical rear fork A and an oblique front tube B, constituting a support for the seat-post, which also constitutes the steering-post. The fork A and front tube B are connected at their lower ends by tubular braces C and at their upper ends by a brace D, and the power for driving the machine may consist of a chainless driving mechanism consisting of a longitudinal rotatory shaft E, connected with the hub of the rear wheel and the crank-axle by any suitable system of gearing, or the ordinary chain-and-sprocket mechanism may be employed. The handle-bars F are rigid and extend forwardly each side of the saddle-post, and the front wheel is guided and the machine steered by the saddle-post through the movement of the rider's body, all as fully set forth in my pending application hereinbefore referred to.

A rectangular frame composed of the tubes 1 2 3 4 is secured by brazing or in any suitable manner to the rear of the frame proper, so as to constitute a rearward continuation of the hollow handle-bars F in order that the telescopic sections G may be housed therein or drawn out, as shown in dotted lines, (see Fig. 2,) and in order that this movement may take place and the telescope-sections be locked in place when distended or drawn out for the purpose hereinafter explained the rear ends of the sections G are constructed, as shown at Fig. 5, so that when slightly rotated upon their axes the thickened portion of the rear ends of such sections will abut against a spud or shoulder H on the interior of the handle-bar and prevent the return of the sections G in an obvious manner, a reverse movement in a rotary direction putting said sections in a position which will enable them to be housed within the handle-bar tubes and the tubes 2 and 4 of the carrying-frame.

The sections G are provided at their outer ends with rings or hooks $a$, adapted to interlock with corresponding hooks which may be attached to the cartridge-belt of the rider, so that as he dismounts forwardly from the machine the sections G will be withdrawn from their housings and constitute, as it were, shafts by which the machine would be trailed behind, while the rider would have free use of his body and limbs, and if the machine should be traveling on a downgrade it is prevented from creeping upon the dismounted rider by slightly rotating one or both of the sections G, so that the thickened portion of the inner end will abut against the stationary spud or shoulder H on the interior of the handle-bar, and, as before stated, a reverse rotary movement of sections G will permit it to house or conceal itself within the handle-bar.

At or near the base or lower end of the saddle-post and steering-fork tube B is secured rigidly a gun-support consisting of a butt-rest I, rising from which is a vertical arm J, to the upper end of which is secured a spring-clip K. The butt-rest is flanged, as shown, to prevent any lateral movement of the butt of the gun, and the clip K grasps the stock just in rear of the breech and holds the gun in a vertical position in front of the rider. As the spring-arms of the clip K are open or separated in front, it will be seen that as the rider dismounts he can grasp his gun and step down over the forward steering-wheel, and as he does so the telescope extensions G, being hooked to his cartridge-belt, will be pulled forward and sustain the bicycle in a vertical position, causing the machine to be trailed behind the dismounted rider. If it becomes necessary at any time for the machine to be entirely disassociated from the rider, it will only be necessary to disconnect the extensions G from the cartridge-belt.

The design of the frame and the relative sizes of the wheels, as will be seen, are such that when the rider is mounted upon the saddle no part of the frame of the machine is in front of him, and, the gun-support being below his crotch and the front wheel being of small diameter, he is perfectly free to dismount forwardly, as already described. This peculiarity of design or construction of the frame, constituting the subject-matter of another pending application for Letters Patent, is not claimed herein, and it will be understood that so far as my present invention is concerned I do not wish to be limited to the exact design or construction shown, so long as the same involves the absence of any frame or part of the frame in front of the rider.

The auxiliary frame, composed of the tubes 1 2 3 4, as before stated, constitutes a support for the knapsack L and haversack M, which may be held in position by flat hooks $b$, secured thereto and adapted to hook over the frame, as shown, or in the absence of such hooks ordinary straps $c$ may be secured to the frame to constitute a swing into which the knapsack and haversack may be placed, the canteen N being swung in any suitable manner from the knapsack. O is an ordinary blanket secured in the usual manner to the knapsack.

The handle-bars F are, as described in the application hereinbefore referred to, rigidly secured to the frame, and the saddle P is mounted upon the steering-fork, the machine being guided by the rider's body when turned in one or the other direction by pulling upon the handle-bars.

I have shown the auxiliary frame as rectangular in form, as best adapted to conform to the knapsack and haversack and in order to give a greater length of reciprocation of the handle-bar sections G; but I do not wish to be confined to this exact form, as any other form which may be suitable for the purpose may be employed without departing from the spirit of my invention.

As the frame of my improved bicycle and the arrangement of the handle-bar are such that the rider mounts from a position in advance of the saddle, it will be readily seen that the location of the baggage in rear of the saddle can in no wise affect the mounting and dismounting.

While I have shown the gun-support as consisting of a butt-support I, a vertical arm J, and a spring-clip K, I do not wish to be limited to such exact details of construction, but may employ any other suitable supporting device, so long as it is arranged in front of the rider and enables the gun to be readily released in a substantially forward direction, as previously described.

While I have shown the handle-bars as extensible through the telescopic sections G, it will be understood that the generic idea of so constructing a machine that the rider when dismounted can without disassociating himself from the machine trail the latter behind him and at the same time have perfect freedom in his personal movements may be accomplished by other constructions than that shown, and it will therefore be understood that I may so construct the handle-bars that they shall be capable of extension forwardly—for instance, the handle-bars F may be jointed and adapted to fold and unfold, or, if desired, there may be attached to the end of the handle-bars or the frame what may be properly denominated "shafts," capable of forward extension. A lazy-tongs construction would fairly illustrate the suggested idea.

Having described the construction and advantages of my improved military bicycle, what I claim as new, and desire to secure by Letters Patent, is—

1. In a bicycle for military purposes, the combination with the frame, and with the handle-bars secured to the frame in rear of the saddle-post and extending forwardly, extensible devices connected with the handle-bars and adapted to constitute shaft-like elongations of the same, whereby the bicycle may be trailed behind a dismounted rider, as hereinbefore set forth.

2. In a bicycle for military purposes, the combination with the frame A, B, C, D, mounted upon a large rear wheel and a comparatively small front steering-wheel, a saddle mounted at the top of the front member of the frame, handle-bars secured to the frame in rear of the saddle-post and extending forwardly, a gun-support secured to the front member of the frame and adapted to hold the gun in a vertical and removable position in advance of the rider and also in advance of the handle-bars, whereby the rider may dismount forwardly and at the same time remove the gun from its support, as hereinbefore set forth.

3. In combination with the tubular handle-bars F, secured at their rear ends to the frame of the bicycle, sections G housed within the handle-bars and adapted to extend forwardly to constitute shafts by which the machine may be sustained in a vertical position and trailed, substantially as and for the purposes set forth.

4. In a bicycle for military purposes, the combination with the frame, the handle-bars secured to the frame in rear of the saddle-post and extending forwardly, and extensible devices connected with the handle-bars and constituting shaft-like prolongations of said handle-bars, means secured to the forward ends of the shaft-like extensions and adapted to interlock with a belt worn by a dismounted rider, whereby the bicycle may be trailed, substantially as and for the purposes set forth.

5. In combination with the frame A, B, C, D, and rigid handle-bars F, the auxiliary baggage-frame 1, 2, 3, 4 secured in position upon the main frame and in the same horizontal plane with the handle-bars, the side bars of the auxiliary frame constituting rearward elongations of the handle-bars, substantially as and for the purposes set forth.

In testimony whereof I affix my signature in presence of two witnesses.

JAMES C. ANDERSON.

Witnesses:
N. CURTIS LAMMOND,
D. G. STUART.